United States Patent [19]

Lindner et al.

[11] Patent Number: 4,748,215
[45] Date of Patent: May 31, 1988

[54] DIORGANOSILOXANE POLYMER POWDER

[75] Inventors: Christian Lindner; Wolfgang Grape, both of Cologne; Hans-Jürgen Kress, Krefeld, all of Fed. Rep. of Germany

[73] Assignee: Bayer Aktiengesellschaft, Leverkusen, Fed. Rep. of Germany

[21] Appl. No.: 910,030

[22] Filed: Sep. 22, 1986

[30] Foreign Application Priority Data

Oct. 2, 1985 [DE] Fed. Rep. of Germany ....... 3535136

[51] Int. Cl.$^4$ ........................................... C08F 283/00
[52] U.S. Cl. .................................... 525/479; 524/457
[58] Field of Search .......................... 525/479; 524/457

[56] References Cited

U.S. PATENT DOCUMENTS 3,635,852 1/1972 Finestone et al. ................... 525/479
3,657,164 4/1972 Jastrow et al. ....................... 525/479
4,224,427 9/1980 Mueller et al. ...................... 525/479

Primary Examiner—Melvyn I. Marquis
Attorney, Agent, or Firm—Connolly and Hutz

[57] ABSTRACT

The invention relates to pulverulent diorganosiloxane polymers and a process for the preparation of such powders.

3 Claims, No Drawings

DIORGANOSILOXANE POLYMER POWDER

Polymeric diorganosiloxanes are frequently used as high-grade rubber materials; they are frequently in the form of oily to rubber-like materials which can be processed by known methods, for example of rubber technology, to form hardened, vulcanized and in some cases reinforced elastomeric shaped articles. However, it would be advantageous and desirable to use free-flowing powders as starting materials in the production of such elastomeric shaped articles.

Usually liquid or highly viscous oils based on polysiloxanes are employed in various fields of processing of thermoplastics and rubber. The employment of the polysiloxanes in the form of powders would also bring advantages in these applications.

Diene, acrylate and olefine rubbers have previously been prepared in powder form (for example by grinding at temperatures below the glass transition temperature) and are used commercially in this way. Polysiloxanes, when treated in the same way, do not yield satisfactory powders. This must partly be attributed to peculiarities in the properties of the polysiloxanes; their glass transition takes place only at very low temperatures and the products become pasty again at room temperature.

The term "satisfactory powders" means that powders must have storage stability at temperatures of up to at least 40° C., must contain as small an amount of contaminants as possible (for example powdering agents, such as $TiO_2$ or $SiO_2$), and must be processible to high-grade plastics.

It has now been found that pulverulent diorganosiloxane polymers must have a particular particle structure and a specific chemical build-up to meet these requirements; such powders can be obtained by a particular polymerization process.

The invention thus relates to diorganosiloxane polymer powder having particles with an average diameter of 0.01-10 mm, in particular 0.08-4 mm, which contain 2-20 and in particular 5-15% by weight, based on the siloxane polymer, of a polymer or copolymer of one or more vinyl monomers polymerized onto these particles.

The invention also relates to a process for the preparation of diorganosiloxane polymer powder having particles with an average diameter of 0.01-10 mm, in particular 0.08-4 mm, wherein an emulsion of a diorganosiloxane polymer is completely broken to form a suspension of diorganosiloxane polymer particles, 2-20 and in particular 5-15% by weight, based on the siloxane polymer of vinyl monomers which form polymers with glass transition temperatures above 25° C. are then introduced into the suspension and then polymerized onto the siloxane polymer particles of the suspension, optionally with the aid of radical forming catalysts.

The diorganosiloxan polymers contained in the powders according to the invention have average molecular weights or more than 30,000 and can be noncrosslinked, branched, partly crosslinked or highly crosslinked. Particularly preferred powders contain at least partly crosslinked diorganosiloxane polymers.

The diorganosiloxane polymers of the powders according to the invention contains units of the general formulae

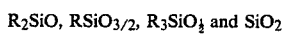

$R_2SiO$, $RSiO_{3/2}$, $R_3SiO_{\frac{1}{2}}$ and $SiO_2$ wherein

R represents a monovalent radical.

The amounts of the individual siloxane units are chosen so that 0 to 10 mol of units of the formula $RSiO_{3/2}$ and 0 to 3 mol of units of the formula $SiO_2$ are present per 100 mols of units of the formula $R_2SiO$.

R can be either a monovalent saturated hydrocarbon radical with 1 to 18 carbon atoms or a free radical reactive group, such as vinyl, allyl or $\gamma$-mercaptopropyl radical. Preferably, at least 80% of all the radicals R are methyl. It is furthermore preferable that some of the radicals R are vinyl and/or $\gamma$-mercaptopropyl groups. It is particularly preferably that both vinyl and $\gamma$-mercaptopropyl groups are present in one molecule. The amount of these free radical reactive groups is from 0 to 10 mol %.

The diorganosiloxane has preferably molecular weight of at least 30,000 and contains, as end groups, units of the formula $R_3SiO_{\frac{1}{2}}$ and/or hydroxyl groups.

Organic solvents, in particular aliphatic hydrocarbons, alcohols, esters and ethers, or water are used as a medium for further processing, according to the invention, of the diorganopolysiloxanes. In a preferred process, aqueous emulsions or diorganosiloxane polymers in water and/or alcohol are used.

A diorganosiloxane with a molecular weight of 30,000, which represents the lower limit in the present invention has a viscosity of about 1,400 mPa.s (compare Noll, Chemie und Technologie der Silicone (Chemistry and technology of the silicones), Verlag Chemie Weinheim 1968, page 219). Silicones with this viscosity can easily be converted into an emulsion by known methods.

Polydimethylsiloxanes with a molecular weight of 60,000 or more, which are useful or even preferred in the present invention cannot be converted into stable emulsions with conventional emulsifying methods. Suitable emulsions can, however, be produced, for example, by emulsions polymerization of suitable silicone oligomers. Thus the preparation of an emulsion of a long-chain silicone oil with terminal OH groups by emulsion polymerization is basically known. See e.g. U.S. Pat. No. 2,891,910 and British Pat. No. 1,024,024. The process disclosed in the British Patent, involving an alkylbenzenesulphonic acid, is particularly preferred since this compound functions as an emulsifier and at the same time as a polymerization catalyst. When the polymerization is finished, the alkylbenzenesulphonic acid is neutralized, so that its catalyst properties are blocked but its emulsifying properties are fully retained, and even improved. The additive concentration can accordingly be kept low, and, after preparation of the emulsion, there are no troublesome catalyst residues in the finished product. Instead of the alkylbenzenesulphonic acids mentioned, n-alkylsulphonic acids can also be used. It is some times advisable to use other emulsifying agents in addition to the sulphonic acids.

Such "co-emulsifiers" can be non-ionic and anionic. Suitable anionic co-emulsifiers are, in particular, salts of the abovementioned n-alkyl- or alkylbenzenesulphonic acids. Non-ionic co-emulsifiers are polyoxyethylene derivatives of fatty alcohols, fatty acids and the like. Examples of such emulsifying agents are POE (3)-lauryl alcohol, POE (20)-oleyl alcohol, POE (7)-nonyl phenol or POE (10)-stearate (POE means polyethylene oxide and the number following POE indicates the average number of ethylene oxide units). The co-emulsifiers added increase the stability of the emulsion resulting after the emulsion polymerization, but may have an adverse influence on the chain length of the long-chain silicone oil formed in the polymerization.

Silicone oils which are formed by emulsion polymerization in the presence of non-ionic co-emulsifiers are in general of lower molecular weight than those with which no co-emulsifier is used. The molecular weight of the silicone oil formed in the emulsion polymerization can furthermore be controlled, for example, via the temperature during the formulation of the equilibrium between the siloxane, water and the silane oil initially formed by ring-opening of the siloxane (reference is made to J. Polymer Sci. Part C, 27 p 27–34 (1969) in respect of details of the relationship between temperature and molecular weight).

The process described below is particularly preferred in the preparation of an emulsion of a long-chain silicone oil with terminal OH groups.

Octamethylcyclotetrasiloxane ("$D_4$") is employed as the monomer in an amount such that a 30–40% by weight emulsion results. The catalyst is 2–6% by weight of an n-alkylsulphonic acid, based on the weight of "$D_4$". The Na salt of this n-alkylsulphonic acid and POE (5)-lauryl alcohol are used as co-emulsifiers. The temperature during the emulsion polymerization is 50°–70° C. and neutralization is carried out with amines, in particular triethanolamine.

Groups which are free radical reactive can be introduced into the silicone polymer by means of siloxane oligomers contaminating such groups. Examples of such oligomers are tetramethyltetravinylcyclotetrasiloxane and/or γ-mercatopropylmethyldimethoxysilane or a hydrolysate thereof.

The polymers can be branched by addition of, for example, tetraethoxysilane or a silane of the formula $RSiX_3$, wherein X represents a hydrolysable group, in particular the alkoxy radical. R is defined as above; preferred is methyl and phenyl. Particularly preferred are tetraethoxysilane, methyltrimethoxysilane and phenyltrimethoxysilane.

The addition of customary fillers is possible either directly after the emulsion polymerization, optionally together with a thickener, or during later processing of the powder to finished product.

Customary fillers are e.g. silicic acids, which can be naturally occurring, pyrogenically produced or precipitated, and/or other particularly fine-particled fillers, such as, for example, precipitated chalks. Suitable silicic acids are materials with a surface area of from 50 to 300 $m^2/g$ (measured by the BET method).

The thickening agents which can be used include cellulose derivatives, alkali metal salts of polyacrylates and polymethacrylates, sodium or ammonium slats of carboxylate copolymers and colloidal clays.

The silicone emulsions of the invention are then coagulated to a coarse-particled suspension in a continuous medium; sedimenting particles thereof have an average diameter $d_{50}$ of 0.01–10 mm, in particular 0.08–4 mm; average particle diameters ($d_{50}$) are determined by ultracentrifuge measurement [W. Scholtan et al., Colloids Z. Polymere, 250, 783–796 (1972)]; "sedimenting" here means that, in contrast to a latex or an emulsion, the particles can settle rapidly due to gravity, that is to say sediment, and that to maintain a suspension stirring or agitating is necessary.

2–20% by weight, in particular 5–15% by weight, based on 100 parts by weight of siloxane polymer, of vinyl monomers which can form homo- or copolymers with glass transition temperatures of more than 25° C. are now introduced into this suspension of the diorganosiloxane polymer particles in an inorganic or organic medium, in particular water and/or alcohol. Suitable vinyl monomers are olefinically unsaturated compounds which can be polymerized by free radicals in particular vinyl or vinylidene monomers such as styrene, α-methylstyrene, nuclear-alkylated styrenes, acrylonitrile, methacrylonitrile, methacrylic acid esters with up to 20 carbon atoms in the molecule, acrylic acid esters with up to 20 carbon atoms in the molecule, acrylic acid, methacrylic acid, vinyl esters, vinyl chloride, vinylidene chloride, vinylidene fluoride and olefines, optionally mixed with acrylamides or (meth)acrylates containing hydroxyl or amino groups; vinyl monomers from the series comprising styrene, acrylonitrile and alkyl methacrylate are particularly preferred.

The amount of such polymer in the powders according to the invention can be varied within certain ranges; to establish optimum properties, the amount of polymer with the optimum effect depends i.a. on the desired particle size of the powder, the siloxane polymer structure and the intended field of use.

The vinyl monomers metered in are polymerized, optionally by initiation with substances which form free radicals, such as peroxides, persulphates, hydroperoxides, azo derivatives or peroxy esters, so that they essentially form a polymer on the surface of the particles of the suspension. The molecular weights of the grafted-on polymer can be varied within wide limits, by means of molecular weight control measures known for polymerization reactions.

The polymerizing-on of the vinyl monomers takes place at temperatures from 20° to 110° C., in particular at temperatures from 40° to 100° C.; the rection media used in the process according to the invention, i.e. the suspension medium and the medium of the vinyl monomer (or monomers), must be matched to one another. The grafted polymer formed must be virtually insoluble in the reaction medium. However, vinyl monomers are preferred which are readily or at least partly soluble in the reaction medium.

After the polymerization has ended, the suspension of the powder according to the invention can optionally be mixed with customary additives, such as stabilizers, plasticizers, antioxidants and pigments.

The polymer is then separated from the reaction medium, for example by filtration, and if appropriate purified by washing and then dried.

The powders according to the invention can be processed with or without crosslinking (vulcanization) with or without addition of fillers on mills, kneaders, calenders or in extruders. They are useful for all applications in which polysiloxanes are employed, that is to say as joint sealing compositions, coating materials or as damping materials. Their commercial application proves to be particularly advantageous in comparison with processing of, for example, pastes or oils.

Shaped objects made from moulding materials according to the invention have good mechanical strengths and surprisingly, also special adhesion properties to the most diverse substrate surfaces.

EXAMPLES

I. Preparation of silicone emulsions 1. 38.4 parts by weight of octamethylcyclotetrasiloxane, 1.2 parts by weight of tetramethyltetravinylcyclotetrasiloxane and 1 part by weight of γ-mercaptopropylmethyldimethoxysilane are mixed. 0.5 part by weight of dodecylbenzenesulphonic acid is added, and 58.4 parts by weight of water are then added in the course of 1 hour with continued stirring. The preliminary emulsion is homogenized with the aid of a high pressure emulsifying machine 2× under 200 bar. A further 0.5 part by weight of dodecylbenzenesulphonic acid is added.

The emulsion is then stirred at 85° C. for 2 hours and subsequently at room temperature for another 36 hours. It is neutralized with 5N NaOH. 100 parts by weight of a stable emulsion with a solids content of about 40% (determined in accordacne with DIN 53 182) result.

2. Another emulsion which contains the constituents of Example (2), with the exception of the γ-mercapto-propylmethyldiethoxysilane, is prepared as described under 1.

3. Another emulsion which in addition to the constituents of Example (2) contains 0.2 part by weight of tetraethoxysilane is prepared as described under 1.

4. A silicone resin emulsion of 30% by weight of silicone resin, 30% by weight of a mixture of xylene and butanol in a weight ratio of 4:1, 1% by weight of non-ionic emulsifier and 39% by weight of water, the silicone resin being a hydrolysis product prepared from 87.4 mol % of methyltrichlorosilane, 10.9 mol % of dimethyldichlorosilane and 1.7 mol % of trimethylchlorosilane.

II. Preparation of powders according to the invention 4,500 parts by weight of water and 180 parts by weight of magnesium sulphate are initially introduced into a reactor and the mixture is heated up to 75° C., with stirring.

X parts by weight of a silicone emulsion (from I) are then allowed to run uniformly into the reactor in the course of 30 minutes.

The following monomer solution of Y parts by weight of monomer and Z parts by weight of 2,6-di-tert.-butyl-p-cresol is then fed into the reactor in the course of 30 minutes. Thereafter, the polymerization is initiated by addition of a solution of 4 parts by weight of potassium peroxide-sulphate in 100 parts by weight of water.

Polymerization is now carried out at 80° C. for 2 hours; polymerization is brought to completion at 90° C. for 1 hour. After cooling, the resulting powder is isolated by filtration or centrifugation, washed and dried.

TABLE 1

Preparation of the powders

| Example | Silicone emulsion | X parts by weight | Monomer | Y parts by weight Z parts by weight p-cresol derivative |
|---------|-------------------|-------------------|---------|---------------------------------------------------------|
| 1 | I.1 | 2144 | MAM | Y = 110 |
|   |     |      |     | Z = 0,1 |
| 2 | I.2 | 2144 | MAM | Y = 110 |
|   |     |      |     | Z = 0,1 |
| 3 | I.3 | 2144 | MAM | Y = 11 |
|   |     |      |     | Z = 0,1 |
| 4 | I.4 | 2860 | MAM | Y = 200 |
|   |     |      |     | Z = 0,2 |
| 5 | I.1 | 2144 | MAM | Y = 100 |
|   |     |      | CHM | Y = 20 |
|   |     |      |     | Z = 0,1 |
| 6 | I.1 | 2144 | MAM | Y = 80 |
|   |     |      | ACN | Y = 30 |
|   |     |      |     | Z = 0,2 |

MAM = methyl methacrylate
ACN = acrylonitrile
CHM = cyclohexyl methacrylate

TABLE 2

Particle diameters ($d_{50}$ values) of the resulting powders

| Example | Particle diameter $d_{50}$ (mm) |
|---------|---------------------------------|
| 1 | 0.12 |
| 2 | 0.15 |
| 3 | 0.20 |
| 4 | 0.35 |
| 5 | 0.20 |
| 6 | 0.11 |

The powders are stable on storage at temperatures of up to at least 30° C. and can be processed as thermoplastics.

What is claimed is:

1. Process for the preparation of diorganosiloxane polymers in powder form having particles with an average diameter of 0.01–10 mm, wherein an emulsion of a diorganosiloxane polymer is completely broken to form a suspension of diorganosiloxane polymer particles, 2–20% by weight, based on the siloxane polymer, of vinyl monomers which form polymers with glass transition temperatures above 25° C. are then introduced into the suspension and are then polymerized onto the siloxane polymer particles, optionally after addition of catalysts which form free radicals.

2. A diorganosiloxane polymer in powder form having particles with an average diameter of 0.01–10 mm comprising a diorganosiloxane polymer having a molecular weight of at least 30,000 and having polymerized thereon from 2 to 20% by weight, based on the diorganosiloxane polymer, of a polymer or copolymer of styrene, acrylonitrile, methacrylonitrile, and alkyl methacrylate or combinations thereof.

3. Diorganosiloxane polymers according to claim 2 wherein the diorganosiloxane polymers are at least partly crosslinked.

* * * * *